United States Patent
Kudo

(10) Patent No.: US 7,430,362 B2
(45) Date of Patent: Sep. 30, 2008

(54) RECORDING APPARATUS WITH DETERMINING WHETHER OR NOT INFORMATION SIGNALS RECORDED PREVIOUSLY ON RECORDING MEDIUM IN ACCORDANCE WITH REPETITIVE RECORDING RESERVATION PROGRAM HAVE ALREADY BEEN REPRODUCED

(75) Inventor: Toshimichi Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 10/902,955

(22) Filed: Aug. 2, 2004

(65) Prior Publication Data
US 2005/0031307 A1 Feb. 10, 2005

(30) Foreign Application Priority Data
Aug. 7, 2003 (JP) .............................. 2003-289290

(51) Int. Cl.
H04N 5/76 (2006.01)
(52) U.S. Cl. .......................................... 386/83; 386/94
(58) Field of Classification Search ................... 386/69, 386/83, 95, 94; 709/231
See application file for complete search history.

(56) References Cited

U.S. PATENT DOCUMENTS

| 6,501,503 | B2 | 12/2002 | Kudo ..................... 348/208.99 |
| 6,573,930 | B2 | 6/2003 | Kyuma et al. ............. 348/208.5 |
| 6,734,901 | B1 | 5/2004 | Kawahara et al. ......... 348/208.4 |
| 7,099,952 | B2 * | 8/2006 | Wong et al. ................. 709/231 |
| 2002/0057893 | A1 * | 5/2002 | Wood et al. .................. 386/46 |
| 2003/0190150 | A1 * | 10/2003 | Kawasaki et al. ............. 386/83 |
| 2003/0227551 | A1 | 12/2003 | Kudo ..................... 348/207.99 |
| 2004/0091235 | A1 | 5/2004 | Gutta | |

FOREIGN PATENT DOCUMENTS

| CN | 1308460 A | 8/2001 |
| EP | 1 091 358 | 4/2001 |
| EP | 1 107 588 | 6/2001 |
| EP | 1 231 786 | 8/2002 |
| JP | 2000-041066 | 2/2000 |
| JP | 2000-138886 | 5/2000 |
| JP | 2000-253325 | 9/2000 |
| JP | 2001-160260 | 6/2001 |
| JP | 2001-210017 | 8/2001 |
| JP | 2002-033983 | 1/2002 |
| JP | 2002-33986 | 1/2002 |
| JP | 2002-100158 | 4/2002 |

(Continued)

Primary Examiner—David E Harvey
(74) Attorney, Agent, or Firm—Fitzpatrick, Cella, Harper & Scinto

(57) ABSTRACT

The present invention provides a recording apparatus having a recorder that records information signals pertaining to broadcast programs received from a receiver onto a recording medium, a setting device that sets a repetitive recording reservation program specifying recording of a broadcast program at each predetermined time interval, and a controller that determines whether or not information signals previously recorded onto the recording medium in accordance with the repetitive recording reservation program have already been reproduced by a reproduction device, and if so causes the recorder to erase the previously recorded information signals and records information signals of a current broadcast, and if not causes the recorder to record the information signals of the current program without erasing the previously recorded information signals.

12 Claims, 11 Drawing Sheets

FOREIGN PATENT DOCUMENTS

| | | |
|---|---|---|
| JP | 2002-218369 | 8/2002 |
| JP | 2002-335476 | 11/2002 |
| JP | 2002-344861 | 11/2002 |
| JP | 2003-023598 | 1/2003 |
| JP | 2003-179839 | 6/2003 |
| WO | 03/043321 | 5/2003 |

* cited by examiner

FIG. 5

| CH | DATE | BEGIN | END | MODE | OVERWRITE |
|---|---|---|---|---|---|
| 6 | 7/11(THUR.) | PM8:00 | PM10:00 | SP | |
| 1 | DAILY | PM7:00 | PM7:30 | LP | ◯ |
| 10 | 7/24(WED.) | PM8:00 | PM10:00 | SP | |
| ... | | | | | |
| 8 | EVERY MON. | PM9:00 | PM9:54 | SP | |
| 3 | EVERY TUE. | AM7:00 | AM7:30 | LP | ◯ |

GENRE SETTING

1102 GENRE
1103 VARIETY
1104 NEWS
1105 MOVIES
1106 DRAMA
1107 EDUCATIONAL

1108 OVERWRITE
1109 NONE
1110 FORCED
1111 NONE
1112 NORMAL
1113 NORMAL

1101

209

208

RECORDING APPARATUS WITH DETERMINING WHETHER OR NOT INFORMATION SIGNALS RECORDED PREVIOUSLY ON RECORDING MEDIUM IN ACCORDANCE WITH REPETITIVE RECORDING RESERVATION PROGRAM HAVE ALREADY BEEN REPRODUCED

FIELD OF THE INVENTION

The present invention relates to a recording apparatus, and more particularly, to a recording reservation function of a recording apparatus.

BACKGROUND OF THE INVENTION

Home VTR systems such as VHS and the like, which use magnetic tape as a recording medium, have become a common feature of most households. In recent years, as personal computers become more widespread, hard disk and other recording devices have continued to become cheaper as well as expand in capacity. At the same time, in the video camera field, DV-type digital recording is becoming the standard recording format.

Against this backdrop, the digitization wave has hit home video decks as well, with products now available that record and reproduce video signals encoded in MPEG2 format to and from a hard disk (hereinafter called a disk recorder).

This type of disk recorder has many advantages over the conventional VTR, such as content management and reproduction utilizing random accessibility, extended time recording, and the ability to play back previously recorded contents while recording new matter at the same time.

With respect to a recording reservation function installed in a disk recorder of this type, an overwrite function has come to be most common.

An overwrite function is a function effective for repeated daily or weekly reserved recordings. When the overwrite function is set to engage, when executing a new program recording, a previously recorded program is erased, so as to be able to use the disk efficiently. Whether the overwrite function is engaged or disengaged can be specified with each recording reservation. When the overwrite function is turned off and a recording reservation made, past programs are saved without being erased.

Japanese Laid-Open Patent Publication No. 2000-138886 discloses a technology in which a certain specified number of recordings are always saved. For example, if four recordings are specified, then the latest program plus the last three recorded programs are saved, with the oldest program automatically erased at the next recording. In addition, Japanese Laid-Open Patent Publication No. 2002-033983 discloses a technology in which, even if the overwrite function is set to be engaged, if past programs are set to an erasure prohibited setting, or if the apparatus is in the process of recording, the past programs will not be erased.

However, there remains the problem that, when the overwrite function is engaged, past programs are erased whether or not a user has viewed them.

In order to avoid such an outcome, it is enough, of course, to disengage the overwrite function. However, in the event that the user forgets to disengage the overwrite function when setting the recording reservation time, a previously recorded program will be overwritten and thus erased.

Moreover, there remains the problem that, with the methods described in the foregoing publications, the user must set the conditions of erasure separately for each of the recorded programs, making the apparatus extremely difficult to operate.

SUMMARY OF THE INVENTION

The present invention has as its object to solve the above-described problems of the conventional art.

Another object of the present invention is to prevent erasure of not-yet-viewed recorded programs while making efficient use of the recording medium, without burdening the user.

In order to achieve these objects, the present invention provides a recording apparatus, comprising:

receiving means for receiving a broadcast program;

recording means for recording information signals pertaining to the broadcast program received via the receiving means onto a recording medium;

reproduction means for reproducing the information signals from the recording medium;

setting means for setting a repetitive recording reservation program that designates repeated broadcast program recording at each predetermined time interval;

determination means for determining whether or not information signals recorded previously onto the recording medium in accordance with the repetitive recording reservation program have already been reproduced by the reproduction means; and control means for controlling recording of a broadcast program specified by the repetitive recording reservation program in response to results of a determination performed by the determination means, wherein the control means erases from the recording medium the previously recorded information signals and records information signals pertaining to a current broadcast program specified by the repetitive recording reservation program if the previously recorded information signals have already been reproduced, and records information signals pertaining to the current broadcast program without erasing the previously recorded information signals from the recording medium if the previously recorded information signals have not been reproduced.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing a recording reservation screen;

DETAILED DESCRIPTION OF THE PREFERRED EMBODIMENTS

Preferred embodiments of the present invention will now be described in detail in accordance with the accompanying drawings.

First Embodiment

Figure 1:
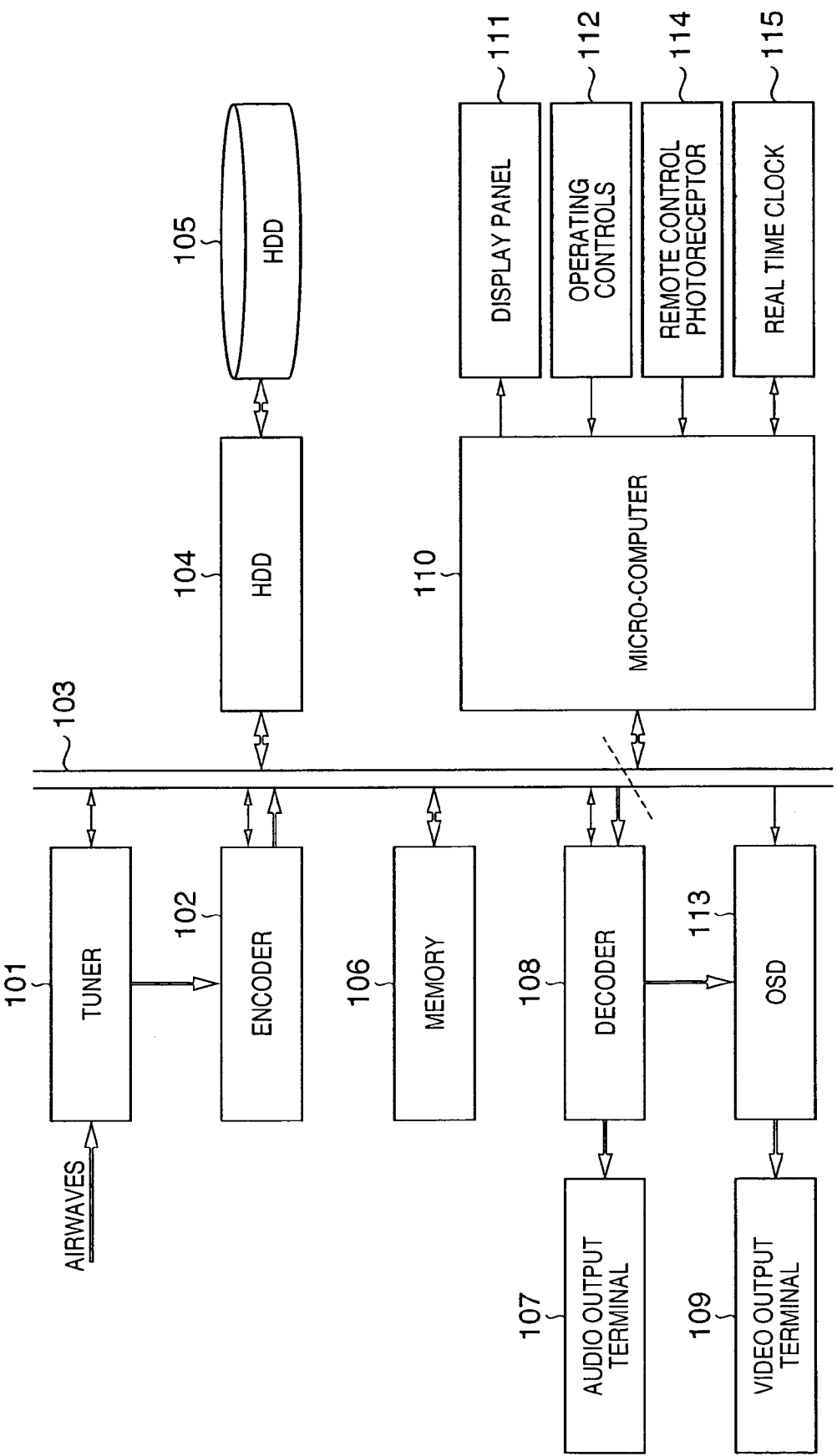
FIG. 1 is a diagram showing an example of the construction of a disk recorder according to a first embodiment of the present invention.

FIG. 1 is a diagram showing an example of the construction of a disk recorder according to a first embodiment of the present invention.

Reference numeral 110 designates a microcomputer that controls the entire system. The microcomputer 110 has at least a nonvolatile memory (ROM) that stores programs, a volatile memory (RAM) that provides work space, an external bus for exchanging data with other hardware and accessing a control register, and a timer for measuring time. Reference numeral 103 designates a bus. In addition to the microcomputer 110 external bus, blocks to be described later are also connected to the bus 103, and exchange data according to the control executed by the microcomputer 110. Reference numeral 101 designates a tuner. In accordance with the control executed by the microcomputer 110, the tuner 101 selects a channel from among broadcasts received through an antenna and a cable and outputs video signals of the selected channel.

Reference numeral 102 is an encoder. In accordance with the control exerted by the microcomputer 110, during video recording the encoder receives the video signals output from the tuner 101 which the encoder then successively converts into MPEG (Moving Picture Experts Group) format digital video data. In addition, the digital video data is output from the encoder 102 with an address at the head specified by the microcomputer 110. Reference numeral 106 designates a memory, blocks of which can be used as work space.

Reference numeral 104 designates a hard disk interface (hereinafter "HDD I/F") and 105 designates a hard disk ("hereinafter "HDD"). The HDD I/F 104 has an interface for the memory 106 and the microcomputer 110 connected to the bus 103 and an interface for the HDD 105, and converts and exchanges a variety of commands and data for accessing a control register of the HDD 105 from the microcomputer 110. In general, an external interface having a hard disk is an ATA (AT Attachment) interface. Recording media other than the HDD 105, such as semiconductor memories and optical disks, may be used as the random-access recording medium for recording the digital video data.

If the HDD 105 is such type of hard disk, then the HDD I/F 104 exchanges a variety of data so that the microcomputer 110 can access the HDD 105 ATA register through the bus 103. The HDD I/F 104 is provided with a so-called direct memory access (DMA) function, in which read or write data is automatically transferred by specifying the data size and lead address on the bus 103 as well as the lead sector on the HDD 105.

Reference numeral 108 designates a decoder, which successively converts the digital video data in read video signals and audio signals and outputs these signals from the address on the bus 103 specified by the microcomputer 110. From memory 106, reference numeral 107 designates a video output terminal and 109 designates an audio output terminal. The video output terminal 107 and the audio output terminal 109 are terminals for outputting externally the respective video signals and audio signals converted into NTSC format by the decoder 108.

Reference numeral 113 is an on-screen display (OSD), which multiplexes onto the video output such information as a variety of setting menus as well as titles and times and generates a reservation setting screen to be described later. Reference numeral 111 denotes a display panel, and is provided in order to display a minimum amount of information on the apparatus. Reference numeral 112 designates a group of operating controls, and functions as an input device for enabling a user to supply power, select record/reproduction, and make a reservation to record by a procedure to be described later.

Reference numeral 114 designates a remote control photoreceptor that receives signals from an infrared light remote control device that are then transmitted to the microcomputer 110 as pulses. The microcomputer 110 converts the pulses into data which it then recognizes as control commands. The infrared remote control is a user input means like the operating controls 112, and the description of operating the operating controls 112 provided below basically applies to the remote control device as well.

Reference numeral 115 designates a real time clock, provided in order to transmit date and time data to the microcomputer 110. Initial values and count start commands are input by the user, using the operating controls 112, and provided through the microcomputer 110. The recording reservation function to be described later uses the time data generated by the real time clock 115. In addition, the time stamp given to the video recording also similarly uses the time data generated by the real time clock 115.

Software for handling a predetermined file system is installed in the microcomputer 110, and data is read from and written to the HDD 105 in accordance with the file system. In addition, a single recording from start to finish is managed as a single content item. For example, the file system may be a FAT (file allocation table)-type file system, treating a single content item as a single file and creating a file entry in accordance with a predetermined rule, and recorded on the HDD 105.

When power is supplied, the microcomputer 110 reads FAT data from the HDD 105 and looks for recordable (empty) space in the HDD 105. Similarly, the microcomputer 110 reads the directory entry and then determines in advance a file name for the next digital video data to be recorded.

The user selects a desired channel using the operating controls 112. The microcomputer 110 continuously detects the status of the operating controls 112, monitoring user operations. When the microcomputer 110 detects a channel selection, the microcomputer 110 outputs a control signal to the tuner 101, causing the tuner 101 to receive the specified channel. In the following description, unless refused, all user operations are transmitted to the microcomputer 110 via-the operating controls 112.

Next, when the user issues a request to start recording, the microcomputer 110 controls the blocks so as to begin recording of the selected broadcast program. First, the microcomputer 110 causes the encoder 102 to begin encoding and to store digital video data with a predetermined memory 106 address at the lead. The encoder 102 notifies the microcomputer 110, by a means such as an insert, each time a predetermined amount of data is stored.

When the microcomputer 110 receives such notification, the microcomputer 110 notifies the encoder 102 of the next storage lead address. Further, the microcomputer 110 issues a command to the HDD I/F 104 to write the digital video data stored in the memory 106 by the encoder 102 to the HDD 105. At this time, the write space in the HDD 105 is recordable (empty) space detected by the file system. The entire process from encoding to writing to the HDD 105 is repeated until a request to stop recording is issued. In addition, management data such as the length of the time of the video recording is either added as a header (or a footer) to the file or generated as a content management file and recorded in the HDD 105.

Next, a description is given of the reproduction operation (reproduction). As might be expected, the user selects the recorded item he or she wishes to reproduce by using the operating controls 112. The usual sequence is involved herein, insofar as a contents list or a representative image (thumbnail image) correlated with the contents is displayed, a pointer is moved to the desired item, and reproduction begins upon selection of the item. Alternatively, the apparatus may be configured so that, by pressing a reproduction key directly (or a key assigned to issue a reproduction command), for example the lead item, a continuation of a previous reproduction, or the last recorded item is reproduced.

The microcomputer 110 then reads the digital video data of an item selected in the foregoing manner from the HDD 105. Specifically, in the reverse of what happens when recording, the microcomputer 110 issues a command to the HDD I/F 104 to cause the HDD I/F 104 to read data from the HDD 105 and store it in the memory 106. At this time, as with the recording operation, the HDD 105 read lead sector, the memory 106 write lead address and the data size are specified by the microcomputer 110.

Next, the microcomputer 110 issues a command to the decoder 108 to decode the digital video data stored in the memory 106. Until the item ends or the process is cancelled or paused by the user, the process of feeding digital video data to be decoded to the decoder 108 continuously and without interruption is repeated.

Figure 2:
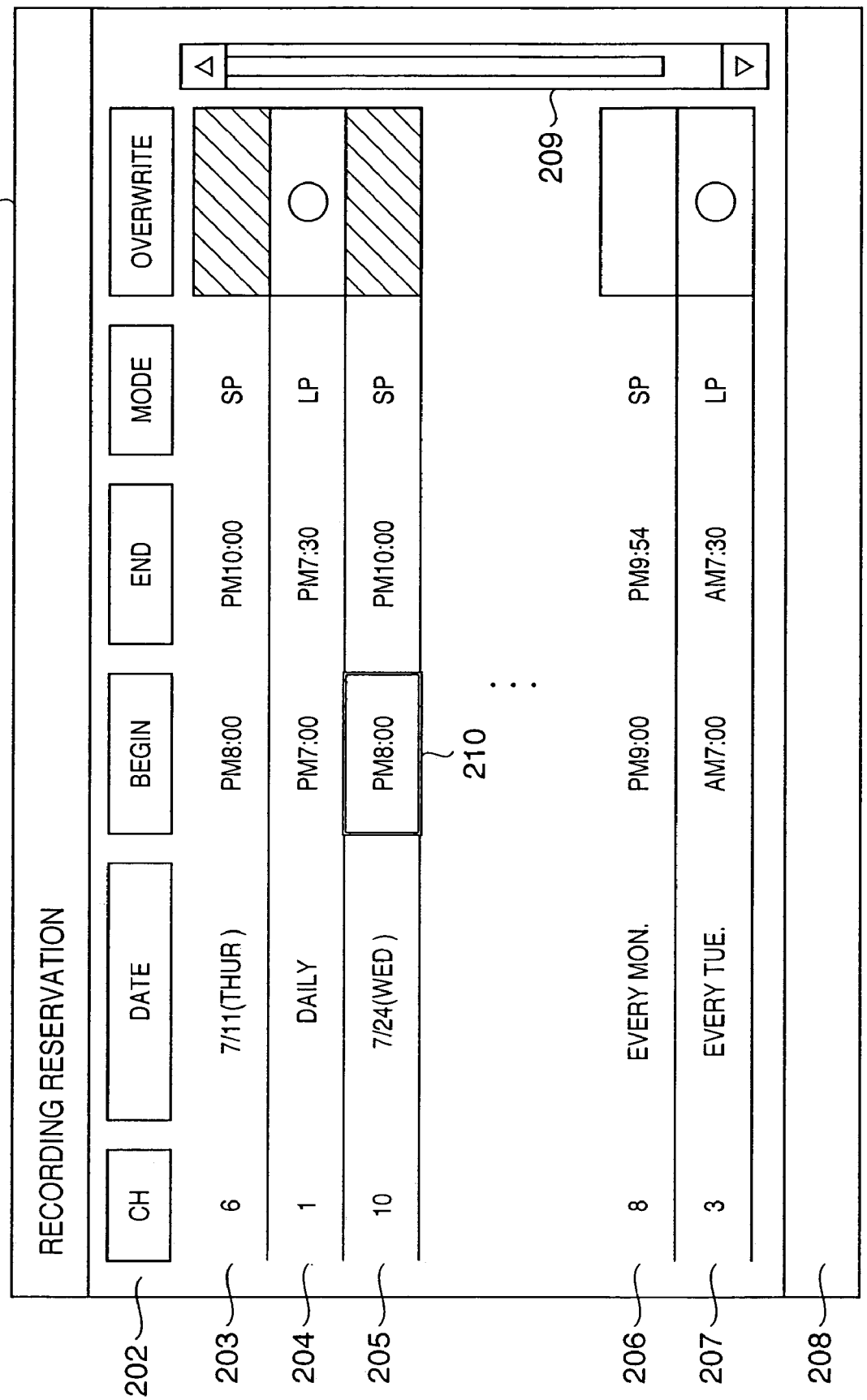
FIG. 2 is a diagram showing a recording reservation screen.

Next, a description is given of recording reservation, using FIG. 2. Recording reservation is now a common feature on most home video decks. Reference numeral 201 shows an example of a recording reservation mode display screen. As described above, when the user requests display using the operating controls 112, the microcomputer 110 generates a display screen like that shown in FIG. 2 using the OSD 113. It should be noted that generation of the recording reservation mode screen 201, even if a request is issued, is prohibited under certain circumstances, for example during video recording.

Reference numeral 202 designates a recording reservation setting title. From the left, CH designates a video recording channel, Date designates the date recorded, Start designates the time video recording began, End designates the time recording ended, Mode designates picture quality mode, and Overwrite turns an overwrite function ON and OFF. In addition, as a recording reservation setting, a title of a program may be further included. Reference numerals 203-207 designate recording reservation programs individually set by the user. The microcomputer 110 automatically records in accordance with the recording reservation program conditions. Directions for using the operating controls 112 and the like may be displayed in a space designated by reference numeral 208. Reference numeral 210 designates a cursor, which can be moved to an editable area by the user. For example, in FIG. 2 the cursor is positioned at a recording start time of recording reservation program 205, which time can be edited if necessary.

As for the date setting, as with recording reservations 203, 205, in addition to setting the date directly, it is possible to select "daily" as with recording reservation program 204, or "weekly X" like recording reservation programs 206, 207. "X" indicates the day of the week, i.e., "Sunday", "Monday", "Tuesday", "Wednesday", "Thursday", "Friday" or "Saturday".

If "daily" is specified, then recording is executed daily at a designated time. If "weekly" is specified, then recording is executed at a designated time each "X-day" of the week. For example, if the user wishes to record every broadcast of a program broadcast every day at a given time, such as the news, then "daily" is selected, and if the user wishes to record every broadcast of a program, such as a serial drama, that is broadcast every week, then by specifying "every X-day" the user can eliminate the bother of having to set the reservation at every broadcast of the program. In the following description, these options are referred to as "daily reservation", "weekly reservation", and, if indicating both without distinction, "recurring reservation". It should be noted that that repetitive recording reservation program is saved even after repetitive recording reservation has been execution, but after execution of normal recording reservations like recording reservation programs 203, 205 the repetitive recording reservation program is at least deleted from the recording reservation mode screen 201.

It should be noted that although in FIG. 2 the picture quality mode has only the standard play SP and extended play LP typical of home video deck picture quality settings, further formats may be also included.

Moreover, the overwrite function can be selected only with recurring reservation, such that those programs having a mark (here ○) such as recording reservation programs 204 and 205, are set to ON, whereas programs left blank are set to OFF. Recording reservation programs 203 and 205 are not recurring reservations and hence the overwrite function cannot be selected.

When the overwrite function is selected (that is, turned ON), it operates as follows:

When executing recurring reservation recording, the flowing determinations are made by the microcomputer 110:

Determination 1: Is the previous program on the HDD 105?

Determination 2: Has the previous program been reproduced at least once?

Figure 4:
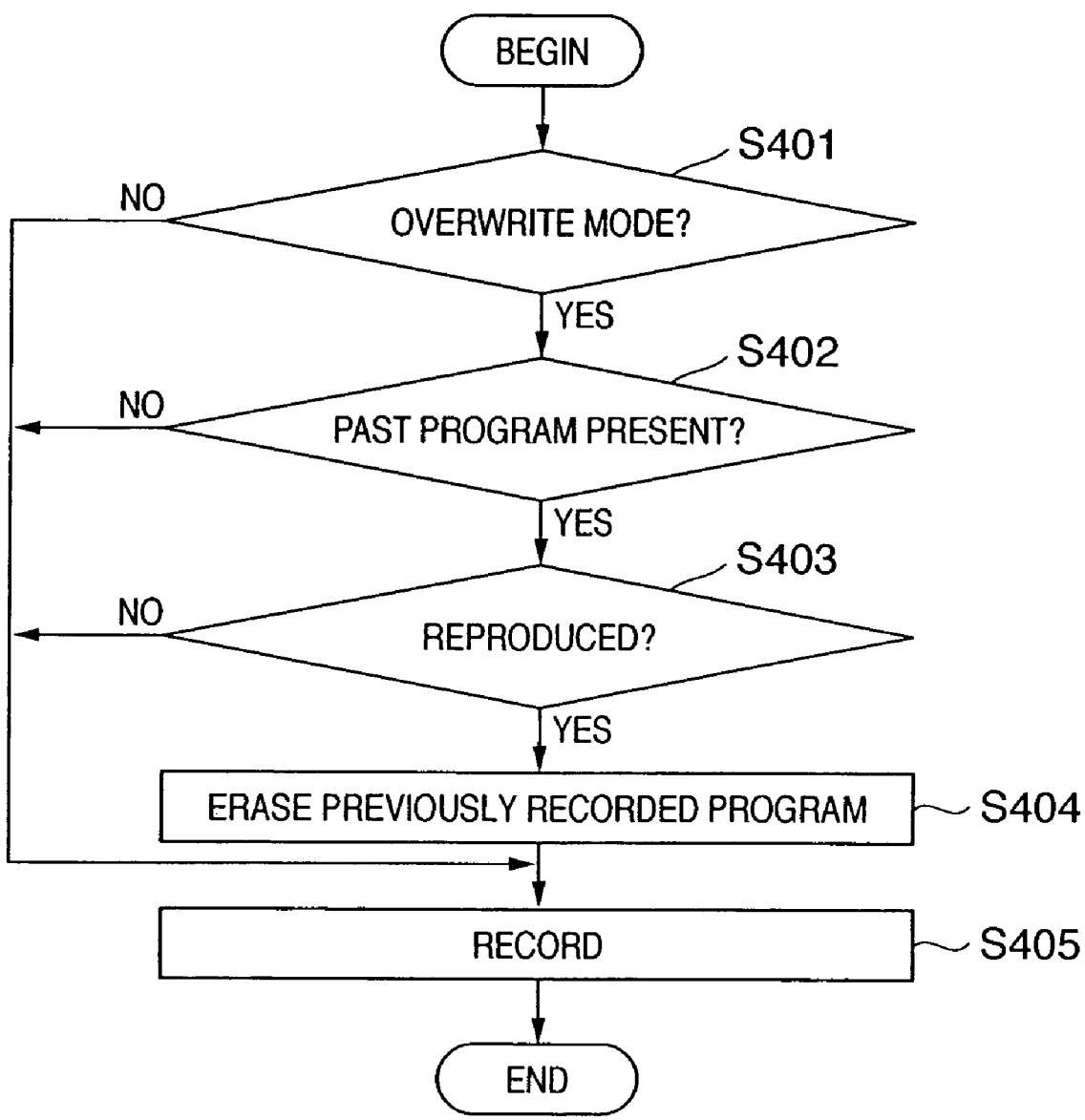
FIG. 4 is a flow chart showing a reserved recording operation according to the first embodiment of the present invention.

From the foregoing determinations the process shown in the flow chart in FIG. 4 is executed. In other words, at some predetermined time prior to the setting time of recurring recording (usually some minutes before), the microcomputer 110 executes the process in FIG. 4.

First, it is determined whether or not the overwrite mode has been set for the reservation program (step S401), and if so, processing then proceeds to a step S402. In a step S402, it is determined whether or not the program last recorded by the recurring reservation program remains recorded on the HDD 105. If the results of this determination indicate that the previous program does exist on the HDD 105, it is then determined whether or not this previous program has been reproduced at least once (step S403). If it is determined that the previous program has been reproduced at least once, then the data for that previous program is erased from the HDD 105 (step S404). Then, when the reservation set time arrives, the specified channel broadcast program is received and recording started, with recording continuing until the recording end time (step S405).

If in steps S401, S402, S403 it is determined that the answer is "NO", then the time to begin recording is awaited and recording is started when that time arrives.

Thus, as described above, in order to identify the data of a program that is recorded by recurring reservation, in the present embodiment, recording reservation program management data unique to each recording reservation program is correlated with recording content and reproduction management data indicating whether or not the content has been reproduced is used.

Figure 3:
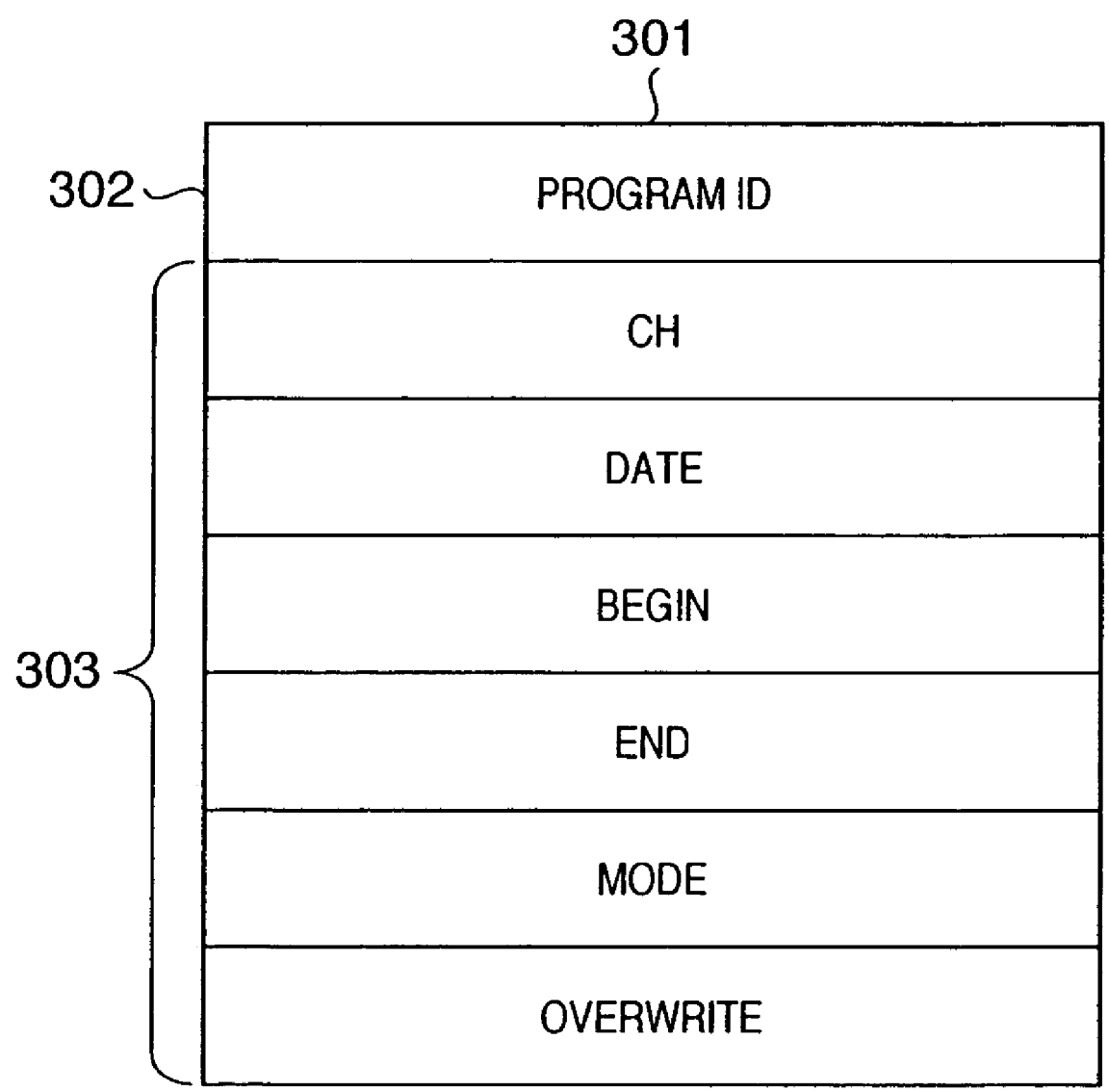
FIG. 3 is a diagram showing a data structure of a recording reservation program.

FIG. 3 shows an example of the data structure of the recording reservation program used in the present embodiment.

Reference numeral 301 designates recording reservation data for a single recording reservation program. Reference numeral 302 designates a program ID, which is the recording reservation program identification number. Rules for assigning program IDs may, for example, be "registration month-day-year plus serial number", with a new program ID whenever the registration contents of the recording reservation program change. For example, if the user newly registers a recording reservation program on Jul. 3, 2002, or if there is a change in the registered content, the program ID 302 is "2002070301". For items registered on the same day, the last two digits of the program ID increase, e.g., "2002070302" and "2002070303". Here, the serial number is the last two digits, but may be any number that accommodates the number of recording reservation programs that can be registered.

Therefore, like 204 in FIG. 2, the same program ID is added to the recurring reservation recorded item and recorded.

Reference numeral 303 designates recording reservation program setting data, whose content, which is set by the user using the recording reservation screen in FIG. 2, is written in a format that the microcomputer 110 can interpret. Thus, the recording reservation data 301 includes at least the program 302 and recording reservation setting data 303. Accordingly, the above-described recording reservation program management data is generated.

Further in FIG. 4, in the recording process in step S405, the program ID 302 is correlated with a recorded item and recorded. Specifically, the program ID 302 is stored in a management data space for the recorded item and recorded. Or, the program ID 302 may be attached to the file name. Or a management file may be created and recorded on the HDD 105.

By so doing, recording reservation program management data can be correlated with an item recorded on the HDD 105 by reserved recording. In addition, reproduction management information can also be created by checking the extent to which a recording is reproduced whenever the recording is reproduced and recording the results separately for each recorded item. The reproduction management data records content data such as the film name, the total number of frames in the recording, and the position of the frame at which reproduction ended. However, when updating the position of frame at which the last reproduction ended, the new recording is written over the old recording only when the new recording is larger than the position at which reproduction of the previously recorded item ended. The foregoing arrangement is designed to accommodate an instance in which the user rewinds the recording at some intermediate point during playback, thus moving the last reproduction position back.

Moreover, in case the last reproduction position is moved forward, for example by fast forwarding the tape or by predetermined time interval skipping, the intermediate frames are treated as having been reproduced.

Then, in the present embodiment, based on the total number of frames in the recording as well as the position of the frame at which the last reproduction ended, of the entire recording, if the reproduced portion proportion exceeds a predetermined value, then the entire recording is deemed to have been reproduced. The apparatus may be configured so that, if such a recording deemed to have been reproduced contains portions that have not in fact been reproduced, the user is notified of that fact.

In addition, in step S402 in FIG. 4, the apparatus may be configured so as to search not only for just the last recorded program but also for a plurality of previously recorded programs recorded using the same repetitive recording reservation program, identify whether or not any of the plurality of previously recorded programs has been reproduced, and automatically erases the reproduced programs.

Moreover, the apparatus may be configured so that, if there is insufficient capacity for storing the latest program except for the space needed for other recording reservation programs, the apparatus deletes past programs having the same program ID, regardless of whether such past programs have been reproduced or not. In addition, the apparatus may be configured so that, of a previously recorded program, only the already reproduced portion of the data is erased. Further, the apparatus may be configured so that during reproduction, even if reproduction of the latest program is specified, reproduction begins not with the latest program but with a not-yet-reproduced program if such a program exists, after which reproduction continues with the latest program. The apparatus may also be configured so as to display notification of such an operation. Or, during reproduction, even if reproduction of the latest program is specified, the apparatus may be configured so as to notify the user that not-yet-reproduced past programs are present, if in fact such programs do exist.

By the foregoing processes, when executing repetitive recording reservation, the present invention can make efficient use of the hard disk that is the recording medium by erasing previously recorded programs using a recording reservation program specifying overwrite recording, while at the same time saving recorded programs that the user has not yet viewed. It should be noted that the repetitive recording reservation program described above may be configured to have modes of from Monday to Friday, and Monday to Thursday.

Second Embodiment

In the first embodiment of the present invention, the apparatus is configured so that for all the recording reservation programs for which overwrite is specified, a determination is made as to whether or not a particular program has been reproduced and not-yet-reproduced programs are not deleted. Such an arrangement is effective in a situation in which, for example, the user employs a repetitive recording reservation program to record program such as a serial drama that is broadcast at regular intervals and wishes to erase the programs once viewed. However, in some cases, such as news broadcasts and weather reports, it is preferable to save the latest program.

Accordingly, a second embodiment of the present invention is provided with three types of overwrite functions, enabling the user to select either a forced overwrite, a normal overwrite or a no overwrite option.

In the forced overwrite mode, if a past program previously recorded by the same recording reservation program is recorded on the HDD 105 when a new program is recorded, then that past program is erased regardless of whether it has been reproduced or not. The normal overwrite mode is the same as the overwrite function described in the first embodiment.

Figure 9:
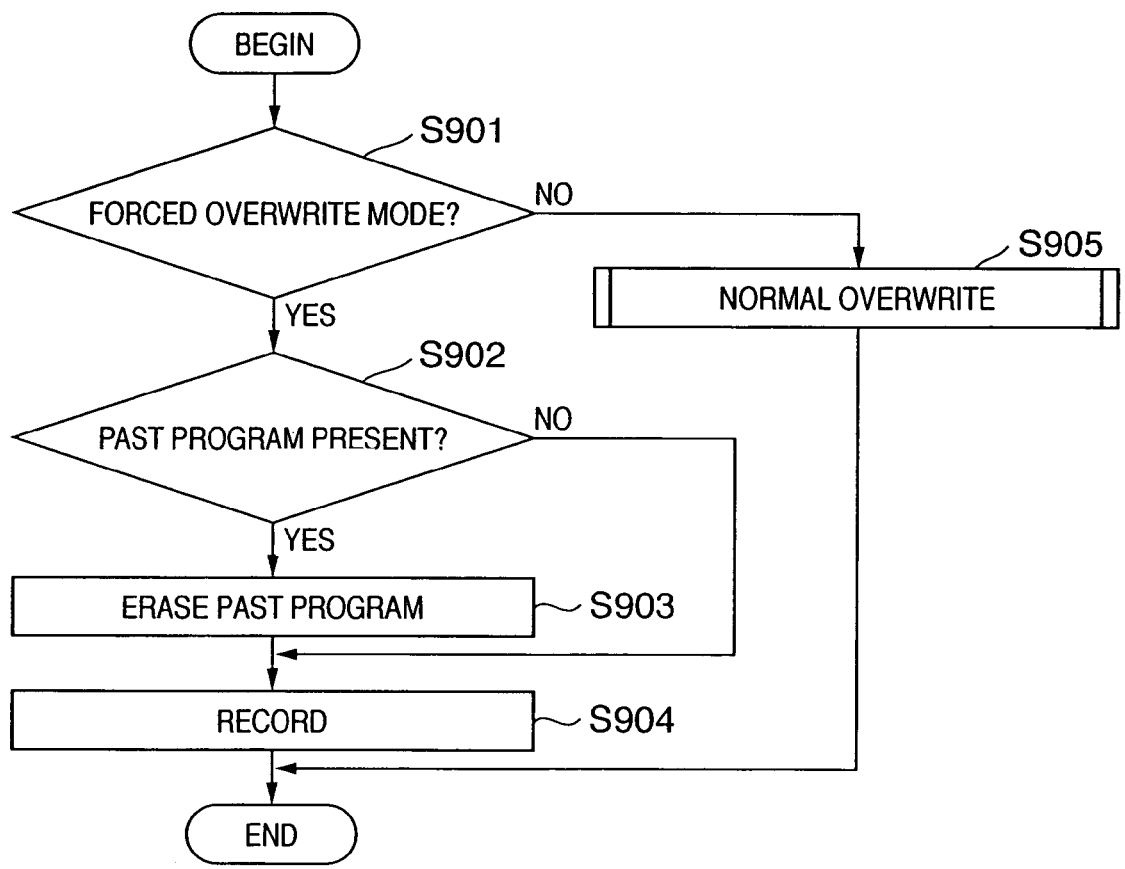
FIG. 9 is a flow chart showing a reserved recording operation according to a second embodiment of the present invention.

The processes performed during execution of the repetitive recording reservation in the present embodiment are described with reference to the flow chart in FIG. 9.

When a predetermined time prior to recording reservation time arrives, it is determined whether or not the repetitive recording reservation program is set to the forced overwrite mode (step S901), and if so, it is determined whether or not past programs recorded by the repetitive recording reservation program are recorded on the HDD 105 (step S902). If past programs are recorded, then past programs recorded using the same recording reservation program are erased from the HDD 105 (step S903). Then, when the time to begin recording arrives, the tuner 101 channel and encoder 102 recording mode are set according to the recording reservation program and recording continues from starting time to ending time.

If in step S902 it is determined that no such previously recorded programs exist, recording commences as is in accordance with the recording reservation program.

Moreover, if in step S901 it is determined that the apparatus is not in the forced overwrite mode, processing proceeds to step S905 and the series of processes shown in the flow chart in FIG. 4 is carried out.

Next, a description is given of an example in which the apparatus is set to overwrite mode using a recording reservation screen. FIG. 5 shows an example of a display screen during recording reservation mode like that shown in FIG. 2, with parts identical in both drawings given identical reference numerals. The screen shown in FIG. 5 differs from that shown in FIG. 2 only in that the cursor 210 is moved to the position of the recording reservation program 204 overwrite setting.

Figure 6:
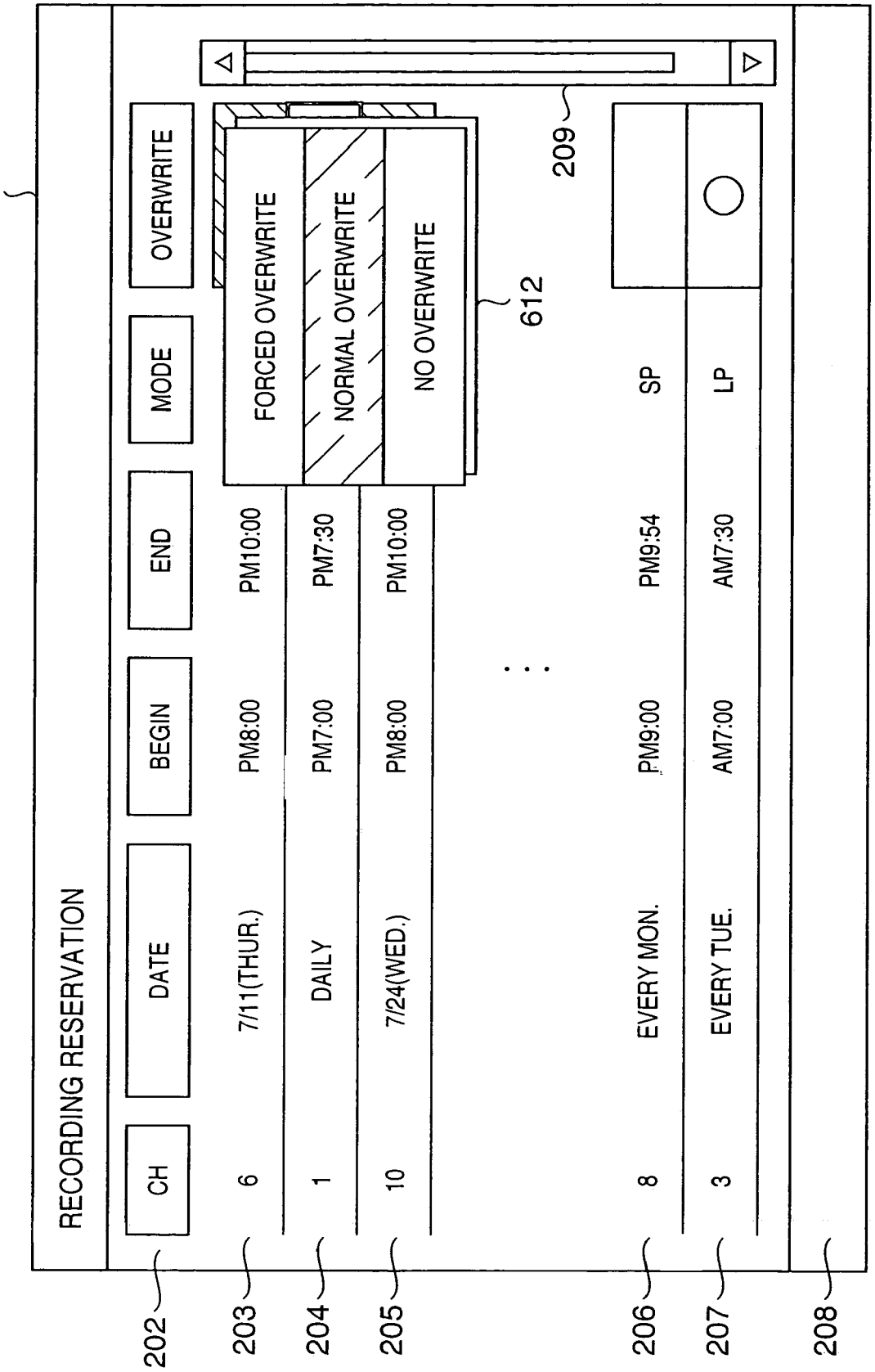
FIG. 6 is a diagram showing a recording reservation screen.

Reference numeral 211 designates a normal overwrite mark, indicating that the current setting is the normal overwrite mode. A display screen for a case in which in such state there has been an operation for the purpose of changing the contents of the recording reservation contents is shown in FIG. 6. Reference numeral 612 designates an overwrite mode setting dialog box. The overwrite mode setting dialog box 612 displays "forced overwrite", "normal overwrite" and "none", and of these three options the one with the shaded portion consisting of slanted lines is selected.

Figure 7:
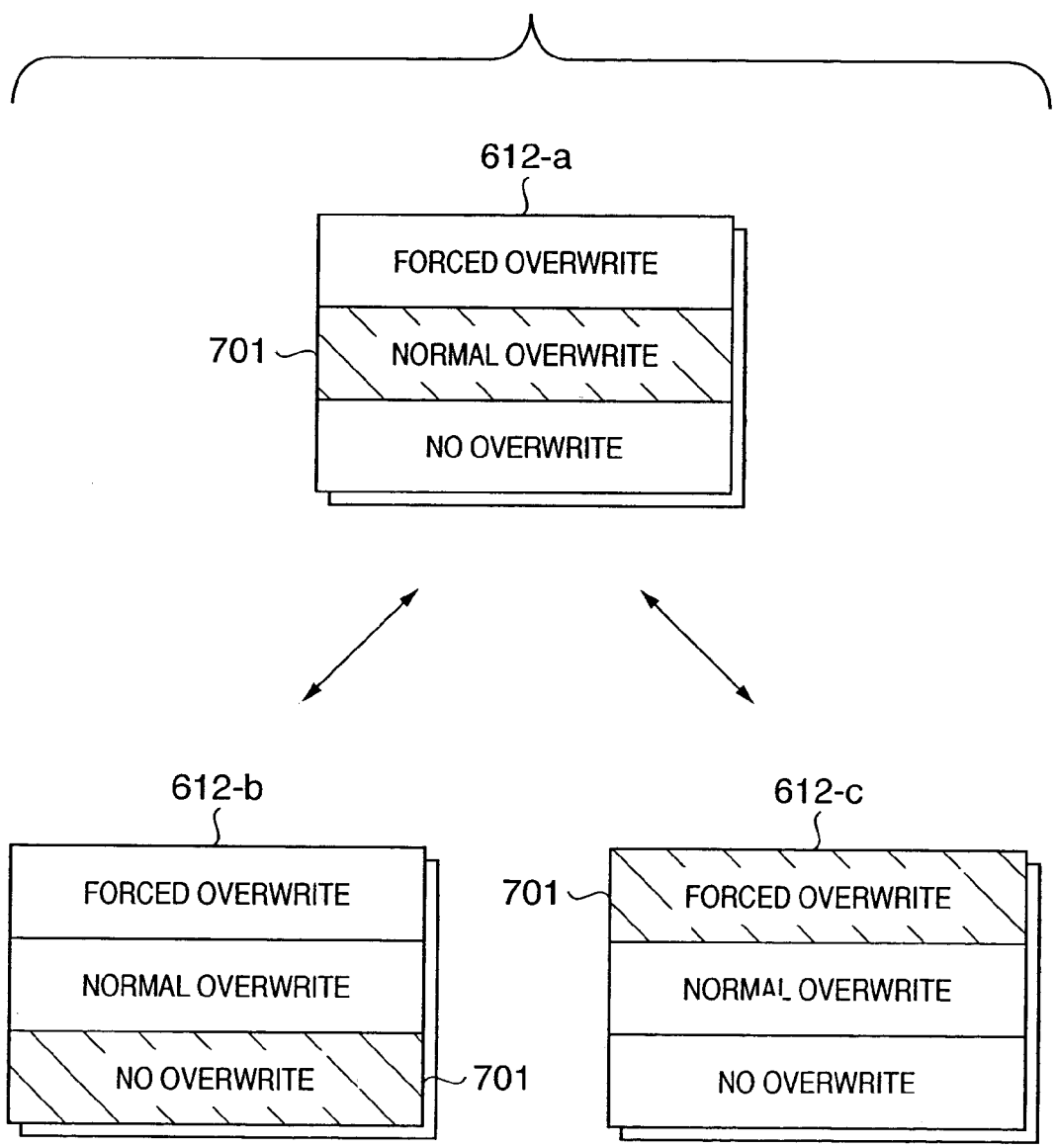
FIG. 7 is a diagram illustrating an overwrite mode setting operation using an overwrite mode setting dialog box.
Figure 8:
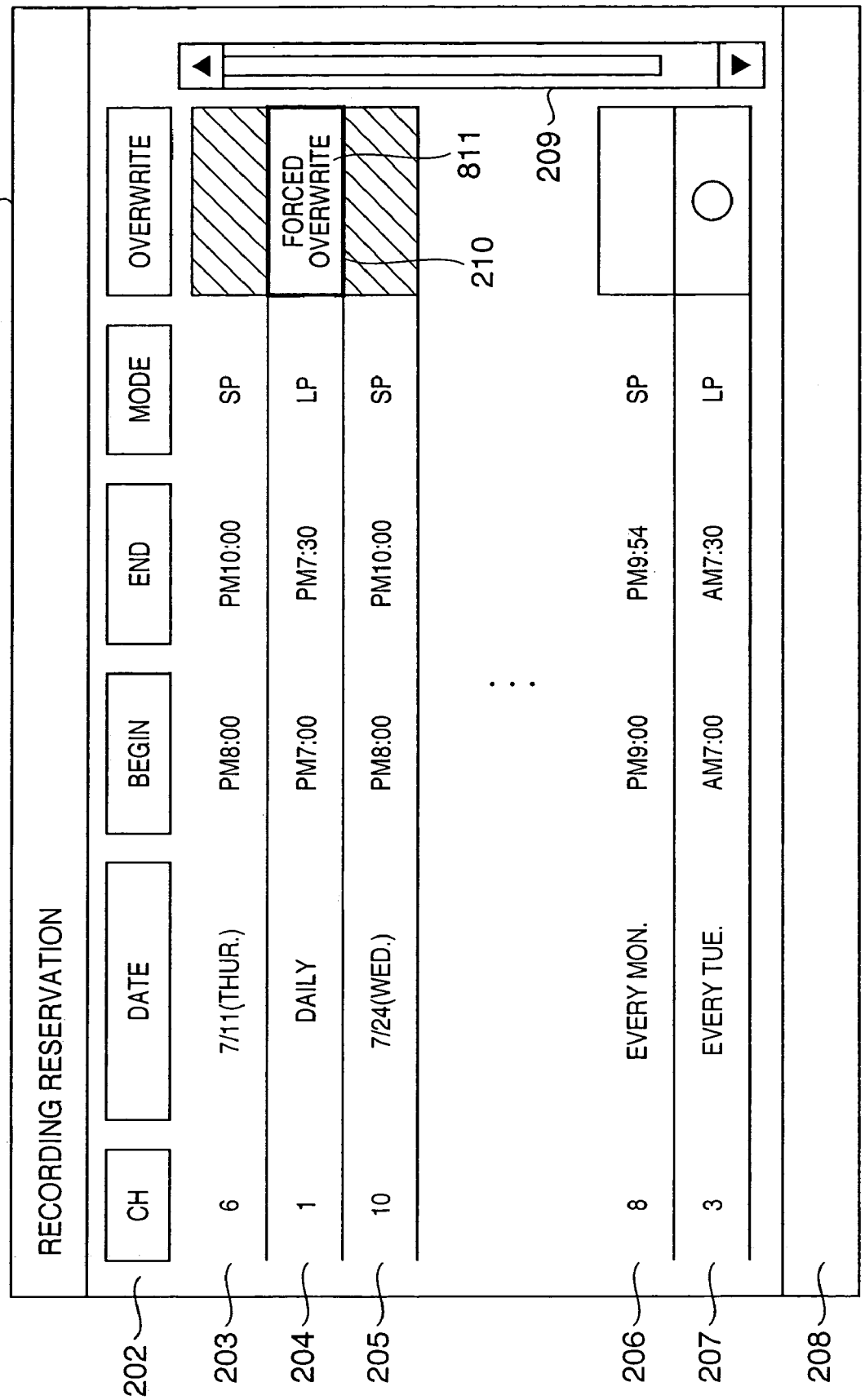
FIG. 8 is a diagram showing a recording reservation screen.

FIG. 7 is a diagram illustrating only the overwrite mode setting dialog box 612. Reference numeral 612-a is the state shown in FIG. 6, with the normal overwrite mode selected. Reference numeral 701 designates the selection, with the background of the shaded portion of the selected item shown (for example) as gray so as to be able to indicate to the user the item currently being selected. Reference numeral 612-b designates a case in which the user has dropped selection down a rung, indicating that no overwrite state is selected. Similarly, reference numeral 612-c indicates a state in which selection has been raised a rung and the forced overwrite mode selected. FIG. 8 shows a recording reservation screen in a case in which, of these three modes, the state 612-c, that is, the forced overwrite mode, is the state in which the overwrite mode setting dialog box 612 is closed. In FIG. 8, reference numeral 811 designates the forced overwrite mark, indicating that the current setting is the forced overwrite mode. Accordingly, the normal overwrite mark in FIG. 5 is changed to the forced overwrite mark 811, indicating that the recording reservation program 204 is set to the forced overwrite mode.

As a result, when executing repetitive recording reservation using the process described above, the present invention enables the user to choose between a forced overwrite mode, in which only the latest program is saved whether it has been reproduced or not, and a normal overwrite mode, in which the operations described above in the first embodiment are carried out, and can thus make more efficient use of the hard disk.

Third Embodiment

Figure 10:
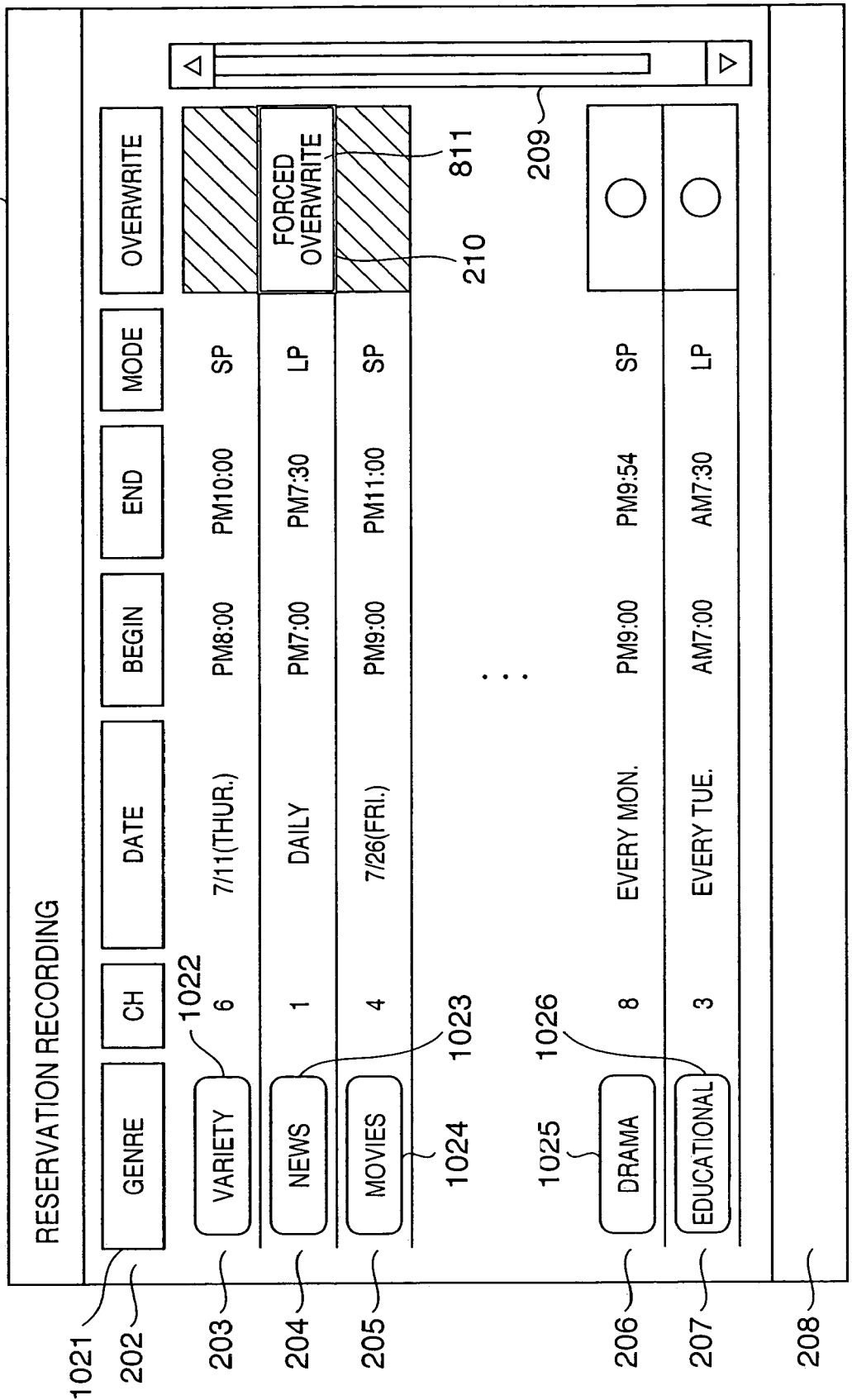
FIG. 10 is a diagram showing a recording reservation screen.
Figure 11:
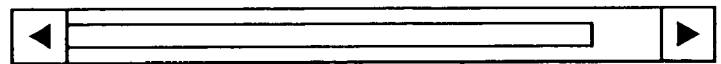
FIG. 11 is a diagram showing a genre setting screen.

A description is now given of a third embodiment of the present invention, using FIGS. 10 and 11.

In contrast to the recording reservation screen described in the second embodiment, FIG. 10 shows an example of a display screen with an enhanced number of display genres. The genres in FIG. 10 are grouped according to program content, and include for example news, drama, movies, educational programming (such as language lectures), variety shows and the like. Reference numeral 1021 designates the genre setting title, and is the same as the other recording reservation settings. Each of reference numerals 1022 through 1026 designates a genre, such that 1022 designates variety shows, 1023 designates news, 1024 designates movies, 1025 designates dramas and 1026 designates educational programming.

When setting the genre, as described in the second embodiment, the user moves the cursor 210 to the genre of the recording reservation program for which the genre is to be changed or set. Next, a genre setting dialog box similar to the overwrite mode setting dialog box 612 described above is displayed, after which the user merely has to select the desired genre. Each genre is correlated with one of either the normal overwrite mode, the forced overwrite mode or no overwrite. FIG. 11 shows such a correlation setting screen.

Reference numeral 1102 designates a genre title and reference numeral 1108 designates an overwrite setting title. Each of reference numerals 1103 through 1107 designates a specific genre, and each of reference numerals 1109 to 1113 designates the overwrite mode corresponding to individual genres. Thus, the overwrite mode corresponding to the "variety show" genre 1103 is no overwrite as indicated by reference numeral 1109, the overwrite mode corresponding to the "news" genre 1104 is the forced overwrite mode indicated by reference numeral 1110, and the overwrite mode corresponding to the "drama" genre 1106 is the forced overwrite mode indicated by reference numeral 1111. Accordingly, it is possible to set the overwrite mode corresponding for each genre separately.

Moreover, the overwrite modes for the genres can be changed by user operation. In addition, the apparatus may be configured so as to enable the user to set up new genres. By thus correlating genres and overwrite modes as described above, the overwrite mode like that shown in FIG. 11 is automatically set when the genre is set using the recording reservation screen in FIG. 10. Moreover, an automatically set overwrite mode automatically set as described above can also be changed with each recording reservation program by user operation. (Note: For repetitive recording reservation program only.)

In addition, by providing the apparatus with a function that can receive an EPG (Electronic Program Guide) distributed over the airwaves or the Internet and can use that EPG for recording reservation, the apparatus may also use genre information sent by EPG. When selecting a program using recording reservation, that recording reservation program genre can also be selected automatically, thus simplifying operation. According to the foregoing embodiment, by using genre information setting of the overwrite mode can be carried out more simply.

Moreover, although the present invention is described in terms of the foregoing three embodiments, the present invention is not limited to the hardware, software, screen structure and designs described herein but encompasses any configuration by which similar capabilities can be achieved. For example, the present invention may be software that runs on a personal computer equipped with a built-in tuner and that achieves the capabilities described above.

As described above, according to the present embodiment a video recording and reproduction apparatus can be achieved that has the following advantage: In repetitive recording reservation that repeatedly records at regular intervals, when executing a recording reservation program in which an overwrite is specified that automatically erases programs previously recorded using the same recording reservation program, efficient use can be made of the recording medium by deleting previously recorded programs that have already been reproduced at least once, and at the same time, recorded programs that have not been reproduced even once can be saved.

Moreover, when executing repetitive recording reservation, even more efficient use can be made of the recording medium by providing a forced overwrite mode that saves only the last recorded program regardless of whether or not such program has been viewed. In addition, operability can be further improved by using genre information.

Furthermore, the objects of the present invention can be achieved by supplying a storage medium storing a software program that implements the functions of the foregoing embodiments to a system or apparatus, reading the supplied program code stored on the storage medium with a computer (or CPU or MPU) of the system or apparatus, and then executing the program code.

In this case, since the program code read from the storage medium itself implements the functions of the above-described embodiment, the program code itself as well as the storage medium on which the program code is stored comprise the invention.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

Besides those cases in which the aforementioned functions according to the embodiments are implemented by executing the program read by computer, the present invention also includes a case in which an operating system or the like running on the computer performs all or a part of the actual processing according to the program instructions, so that the functions of the foregoing embodiments are implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

As many apparently widely different embodiments of the present invention can be made without departing from the spirit and scope thereof, it is to be understood that the invention is not limited to the specific preferred embodiments described above thereof except as defined in the claims.

CLAIM OF PRIORITY

This application claims priority from Japanese Patent Application No. 2003-289290 filed on Aug. 7, 2003, which is hereby incorporated by reference herein.

What is claimed is:

1. A recording apparatus comprising:
receiving means for receiving a broadcast program;
recording means for recording information signals pertaining to the broadcast program received via the receiving means onto a recording medium;
reproduction means for reproducing the information signals from the recording medium;
reservation setting means for setting a repetitive recording reservation program that designates repeated broadcast program recording at each predetermined time interval;
determination means for determining whether or not information signals recorded previously onto the recording medium in accordance with the repetitive recording reservation program have already been reproduced by the reproduction means;
mode setting means for setting a first mode and a second mode, in the first mode erasing from the recording medium the previously recorded information signals pertaining to the broadcast program specified by the repetitive recording reservation program and recording information signals pertaining to a current broadcast program specified by the repetitive recording reservation program if it is determined by the determination means that the previously recorded information signals pertaining to the broadcast program specified by the repetitive recording reservation program have already been reproduced, and recording information signals pertaining to the current broadcast program specified by the repetitive recording reservation program without erasing the previously recorded information signals pertaining to the broadcast program specified by the repetitive recording reservation program from the recording medium if it is determined that the previously recorded information signals pertaining to the broadcast program specified by the repetitive recording reservation program have not been reproduced, and in the second mode erasing the previously recorded information signals regardless of the results of the determination performed by the determination means and recording information signals pertaining to the current broadcast program; and
control means for controlling the recording means in accordance with a mode set by the mode setting means.

2. An apparatus according to claim 1, wherein the discrimination means determines that the previously recorded information signals have been reproduced if a previously reproduced proportion of the previously recorded information signals exceeds a predetermined value.

3. An apparatus according to claim 1, wherein:
the determination means determines whether or not each of information signals pertaining to a plurality of broadcasts previously recorded onto the recording medium in accordance with the repetitive recording reservation program have been reproduced by the reproduction means; and
in a first mode, the control means erases from the recording medium information signals that have already been reproduced from among the information signals pertaining to the plurality of previously recorded broadcasts.

4. An apparatus according to claim 1, wherein the reservation setting means can set an interval of the repetitive recording to an arbitrary interval length.

5. An apparatus according to claim 1, wherein:
the recording means further records management data relating to the repetitive recording reservation program set by the setting means together with the information signals; and based on the management data, the determination means detects information signals previously recorded in accordance with the repetitive recording reservation program.

6. An apparatus according to claim 1, further comprising a display control means for generating a program display screen showing contents of the repetitive recording reservation program set using the setting means and outputting the screen to a display device, wherein the mode setting means is set to the first mode or the second mode using the program display screen.

7. An apparatus according to claim 6, wherein:

the reservation setting means can set a plurality of repetitive recording reservation programs;

the display control means displays contents of the plurality of repetitive recording reservation program on the program display screen; and the reservation setting means can be set to a first mode or a second mode independently for the plurality of repetitive recording reservation programs.

8. An apparatus according to claim 1, wherein the mode setting means is set to either the first mode or the second mode depending on the genre of the broadcast program.

9. An apparatus according to claim 8, wherein the mode setting means detects the genre of a broadcast program specified by the repetitive recording reservation program based on genre information received from the reception means and added to the broadcast program.

10. An apparatus according to claim 8, wherein:

the reservation setting means, using program listing information transmitted together with the broadcast program, sets the repetitive recording reservation program; and based on the program listing information, the mode setting means detects the genre of the broadcast program specified by the repetitive recording reservation program.

11. An apparatus according to claim 1, wherein the recording medium is a random-access recording medium.

12. An apparatus according to claim 1, wherein the recording medium is a disk medium.

* * * * *

UNITED STATES PATENT AND TRADEMARK OFFICE
CERTIFICATE OF CORRECTION

PATENT NO. : 7,430,362 B2
APPLICATION NO. : 10/902955
DATED : September 30, 2008
INVENTOR(S) : Toshimichi Kudo It is certified that error appears in the above-identified patent and that said Letters Patent is hereby corrected as shown below:

ON THE TITLE PAGE:
At Item (75), Inventor, "Tokyo" should read --Kanagawa--.

Signed and Sealed this

Tenth Day of March, 2009

JOHN DOLL
*Acting Director of the United States Patent and Trademark Office*